US008775521B2

(12) United States Patent  (10) Patent No.: US 8,775,521 B2
Feaver et al.  (45) Date of Patent: Jul. 8, 2014

(54) METHOD AND APPARATUS FOR DETECTING ZOMBIE-GENERATED SPAM

(75) Inventors: John Feaver, Oakhurst, NJ (US); Tony Hansen, South Amboy, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1585 days.

(21) Appl. No.: 11/478,941

(22) Filed: Jun. 30, 2006

(65) Prior Publication Data

US 2008/0005316 A1    Jan. 3, 2008

(51) Int. Cl.
*G06F 15/16* (2006.01)

(52) U.S. Cl.
USPC ........................................................ 709/206

(58) Field of Classification Search
CPC .... H04L 63/1458; H04L 51/12; H04L 12/585
USPC ................................................. 709/206–207
See application file for complete search history.

(56) References Cited

U.S. PATENT DOCUMENTS

| | | | | |
|---|---|---|---|---|
| 5,805,442 | A * | 9/1998 | Crater et al. | 700/9 |
| 6,453,359 | B1 * | 9/2002 | Bender et al. | 709/248 |
| 7,032,023 | B1 * | 4/2006 | Barrett et al. | 709/225 |
| 7,631,044 | B2 * | 12/2009 | Yu | 709/206 |
| 7,756,933 | B2 * | 7/2010 | Reshef et al. | 709/206 |
| 7,930,413 | B2 * | 4/2011 | Peddemors et al. | 709/229 |
| 8,464,346 | B2 * | 6/2013 | Barai et al. | 726/25 |
| 8,589,304 | B2 * | 11/2013 | Patel et al. | 705/59 |
| 2002/0099780 | A1 * | 7/2002 | Scheussler et al. | 709/206 |
| 2002/0129264 | A1 * | 9/2002 | Rowland et al. | 713/200 |
| 2002/0138279 | A1 * | 9/2002 | Al-Kazily et al. | 705/1 |
| 2003/0026220 | A1 * | 2/2003 | Uhlik et al. | 370/328 |
| 2004/0014486 | A1 * | 1/2004 | Carlton et al. | 455/550.1 |
| 2004/0034794 | A1 * | 2/2004 | Mayer et al. | 713/200 |
| 2004/0143635 | A1 * | 7/2004 | Galea | 709/206 |
| 2004/0199592 | A1 * | 10/2004 | Gould et al. | 709/206 |
| 2005/0120090 | A1 * | 6/2005 | Kamiya | 709/213 |
| 2005/0132060 | A1 * | 6/2005 | Mo et al. | 709/227 |
| 2005/0182735 | A1 * | 8/2005 | Zager et al. | 705/67 |
| 2005/0229254 | A1 * | 10/2005 | Singh et al. | 726/23 |
| 2005/0246344 | A1 * | 11/2005 | Keller et al. | 707/10 |
| 2006/0031359 | A1 * | 2/2006 | Clegg et al. | 709/206 |

(Continued)

OTHER PUBLICATIONS

PCT International Search Report corresponding to PCT Patent Application PCT/US2007/014293 filed Jun. 18, 2007 (3 pages).

(Continued)

*Primary Examiner* — Rupal Dharia
*Assistant Examiner* — Marcus McKenzie
(74) *Attorney, Agent, or Firm* — Wolff & Samson, PC

(57) ABSTRACT

Disclosed is a method and system for detecting a zombie attack in a network having a plurality of computers. The method and system include a network analysis module for determining, for each computer, a working set of email addresses associated with emails sent by each computer. A zombie attack is detected by determining at least one of: 1) at least one computer in the plurality is transmitting more than a threshold rate of emails, 2) that at least one of the computers is transmitting more than a first threshold number of emails to email addresses outside of its associated working set, 3) that a first threshold number of computers in the plurality are transmitting email messages to email addresses outside of their associated working set, and 4) that more than a second threshold number of computers are transmitting more than a second threshold number of emails to a recipient computer.

9 Claims, 4 Drawing Sheets

(56) References Cited

U.S. PATENT DOCUMENTS

| | | | |
|---|---|---|---|
| 2006/0074896 A1* | 4/2006 | Thomas et al. | 707/4 |
| 2006/0075048 A1* | 4/2006 | Gruper et al. | 709/206 |
| 2006/0080444 A1* | 4/2006 | Peddemors et al. | 709/227 |
| 2006/0107318 A1* | 5/2006 | Jeffries et al. | 726/22 |
| 2006/0161989 A1* | 7/2006 | Reshef et al. | 726/26 |
| 2006/0168202 A1* | 7/2006 | Reshef et al. | 709/224 |
| 2006/0195531 A1* | 8/2006 | Braun et al. | 709/206 |
| 2006/0259551 A1* | 11/2006 | Caldwell, Jr. | 709/204 |
| 2006/0259561 A1* | 11/2006 | Takahashi et al. | 709/206 |
| 2007/0005782 A1* | 1/2007 | Zheng | 709/230 |
| 2007/0033650 A1* | 2/2007 | Grosse et al. | 726/22 |
| 2007/0061211 A1* | 3/2007 | Ramer et al. | 705/25 |
| 2007/0204341 A1* | 8/2007 | Rand et al. | 726/22 |
| 2007/0282770 A1* | 12/2007 | Choi | 706/20 |
| 2007/0282955 A1* | 12/2007 | Lin et al. | 709/206 |
| 2008/0005316 A1* | 1/2008 | Feaver et al. | 709/224 |
| 2008/0172468 A1* | 7/2008 | Almeida | 709/206 |
| 2009/0077664 A1* | 3/2009 | Hsu et al. | 726/24 |
| 2012/0239660 A1* | 9/2012 | Patel et al. | 707/741 |

OTHER PUBLICATIONS

PCT Written Opinion of the International Searching Authority corresponding to PCT Patent Application PCT/US2007/014293 filed Jun. 18, 2007 (7 pages).

* cited by examiner

METHOD AND APPARATUS FOR DETECTING ZOMBIE-GENERATED SPAM

BACKGROUND OF THE INVENTION

As the Internet has grown, the benefits associated with the Internet have also increased greatly. People can stream continuous audio and video (e.g., listen to Internet radio stations, watch news videos, etc.), play on-line games, download movies and music, share pictures with friends and family, and collaborate with co-workers all over the world.

The Internet has grown tremendously since its inception, and the traffic communicated over the Internet is enormous. Part of this traffic is spam, or unsolicited junk email. Spam is often used to advertise a particular product or service. With the number of emails communicated over the Internet increasing at an enormous rate, spam too has increased rapidly.

Another form of unwanted email is messages that contain viruses or worms. Typically, these emails are associated with an attachment or an executable file. When the attachment is opened or when the executable is downloaded, the machine often becomes infected with a virus or worm.

Customers (also referred to below as users), in turn, may complain to their Internet Service Provider (ISP) about the amount of spam that they receive. Because spam is such an annoyance to customers, and also because spam makes it more difficult to recognize emails that the customer wants to receive, ISPs typically want to limit the amount of spam that their customers receive.

One technique available to limit spam is spam filtering software. Filters can focus on particular keywords in the subject line of an email to attempt to identify and delete spam. These filters, however, can be sidestepped by spelling those particular keywords differently (e.g., with dashes separating the letters). Additionally, filters may block email having the particular keyword in its subject while the email is an email that a customer wants to receive. More advanced filters, known as heuristic filters, attempt to statistically identify spam based on word patterns or word frequency. A spammer, or a person who sends spam, can still circumvent these advanced filters, such as by using short messages.

A spammer may have an array of servers transmitting spam, with each server having its own Internet Protocol (IP) address. Once spam is detected as being transmitted from a particular IP address, that IP address is put onto a blacklist. ISPs that host email accounts often look at the sending IP address of every email and filter out those emails that have an IP address that matches an IP address on the blacklist.

One technique that spammers use to avoid having their IP address put on the blacklist is by using "zombie" computers for spam. A zombie computer is a computer that is under the control of another computer (e.g., the controller). Specifically, a spammer typically uses a controller computer to write a program called a daemon. A daemon is a program that is implanted on a zombie computer and puts the zombie computer under the control of the spammer without the knowledge of the user of the zombie computer. The daemon executes in the background unknowing to the user of the zombie computer, thereby "stealing" the zombie computer's resources. The controller transmits this daemon to one or more zombie computers via an attachment or over a network. When the daemon arrives at the zombie computer, the daemon executes in the background without the user of the zombie computer noticing any change.

To convert a computer to a zombie computer, the spammer performs several steps. One step is to infect the zombie computer. A method spammers use to infect the zombie computer is to send an email message to the user that contains the daemon, with some enticement to get the user to open the attached daemon. The message may also attempt to exploit flaws in common email programs that would allow the daemon to be installed directly. Another method is to use a "port scanner" of the user's machine to look for flaws.

Specifically, computers connected to the Internet have thousands of ports that work like doors for network services. For example, mail typically travels through ports 25, 110, 143, and 587, and website data typically travels through port 80. Only a few of these "doors" are open at a time, depending on what kind of data a computer accepts or sends. The spammer, trying to convert a computer to a zombie, executes a port scanner that sends messages to all possible ports of the computer to see which ones are open and accept information, and what kind of computer it is.

Many programs that accept data have flaws. The spammer uses a toolkit of different programs to identify these flaws on available ports. If a flaw is available, the spammer can inject the daemon into the computer. When the spammer logs off of a computer, the daemon uses its own toolkit to find a flaw in yet another computer. If the daemon finds a flaw, the daemon can then install another daemon on another computer. The daemons can then use the zombie computers to transmit spam email, or unsolicited junk email, to one or more recipients. The daemon can, for example, send spam to email addresses stored on the zombie computer, or receive a list of addresses from the spammer indicating where to send the spam.

The daemons therefore enable spammers to route spam emails through the zombie computers. Since the IP addresses of these machines are new, the IP addresses do not appear in the IP address blacklists and millions of spam emails can be routed through the zombie computers before they get blacklisted.

Another mechanism ISPs use to determine a spam attack is based on the rate of message transmission from a single host. If an unknown host is sending vast quantities of messages to the ISP, that host is treated as a potential spammer, and subsequently limited in the message rates permitted from that host. By using zombies, instead of sending thousands of messages from a small number of hosts to the ISP, a small number of messages would be sent from thousands of zombies. Each zombie will fall under the radar for the rate limiting of the ISP, and would not be detected. This is often referred to as a trickle attack.

Detecting spam sent from zombie computers is therefore often a difficult task. To reduce the amount of spam received by ISP's customers, there remains a need for ISPs to detect spam generated by zombie computers.

BRIEF SUMMARY OF THE INVENTION

The present invention is a method and system for detecting a zombie attack in a network having a plurality of computers. In one aspect of the invention, a network analysis module determines, for each computer in the plurality of computers, a set of email addresses associated with emails sent by each computer. This set is referred to below as that user's "working set". Each working set may be associated with a subset of or the full set of emails sent by each computer. A zombie attack is then detected by determining one or more of the following: 1) at least one computer in the plurality of computers is transmitting more than a threshold rate of emails, 2) one or more computers in the plurality of computers is transmitting more than a first threshold number of emails to email addresses outside of its associated working set, 3) more than a first threshold number of computers in the plurality of computers are transmitting email messages to email addresses outside of their associated working set, and 4) more than a second threshold number of computers are transmitting more than a second threshold number of emails to a recipient computer.

Various embodiments are discussed below. The first threshold number of emails may be equal to the second threshold number of emails. The first threshold number of computers may be equal to the second threshold number of computers.

Network analysis may be performed on each computer to determine a list of email addresses associated with each computer. The working set of email addresses can be determined from the list by determining to which email addresses in the list each computer sends email messages. The working set of email addresses can be updated at any time.

These and other advantages of the invention will be apparent to those of ordinary skill in the art by reference to the following detailed description and the accompanying drawings.

DETAILED DESCRIPTION

Spam, or unsolicited junk email, is a problem experienced by many customers of an Internet Service Provider (ISP). Often, spam is sent from so-called "zombie" computers, which are personal computers that are under the control of another controlling computer. It is often extremely difficult for an ISP to detect when spam is being generated by a zombie computer.

As described above, a spammer typically uses a controller computer to execute a program called a daemon. The daemon executes in the background unknown to the user of the zombie computer and "steals" the computer's resources. A controller transmits this daemon to one or more zombie computers via an email attachment or over a network.

Figure 1:
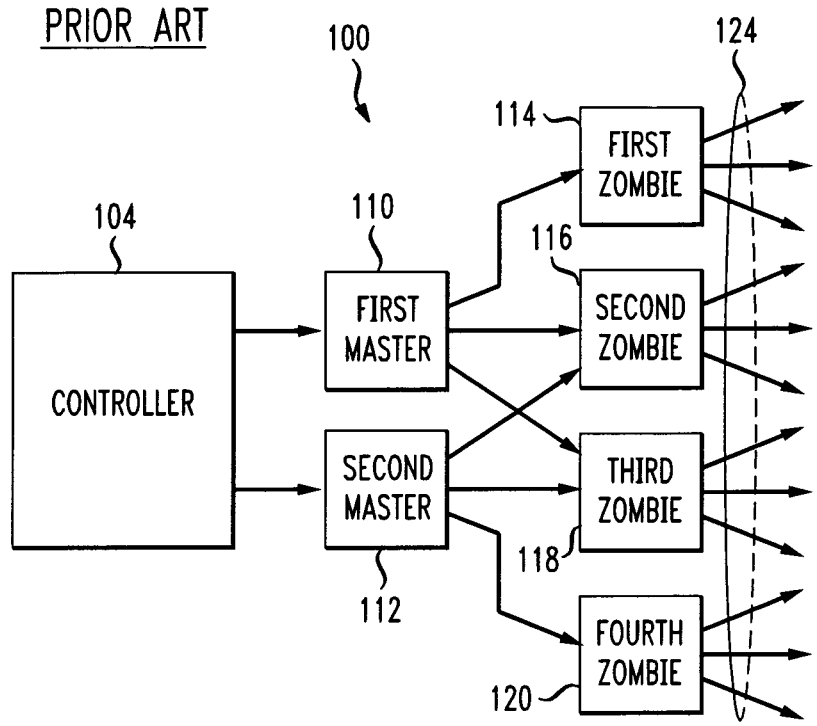
FIG. 1 is a block diagram of a prior art network having four zombie computers.

FIG. 1 shows a prior art network 100 having a controller 104 controlling zombie computers to email spam. The controller 104 first compromises a set of master computers (also referred to as hosts), such as a first master computer 110 and a second master computer 112 (e.g., using vulnerability scanners). The master computers 110, 112 are computers that the controller 104 uses to begin the spam-sending process (or a Denial of Service attack).

Each master computer 110, 112 communicates with and controls one or more zombie computers. The master and zombie computers are typical computers executing typical software applications. For example, the first master computer 110 communicates with a first zombie computer 114, a second zombie computer 116, and a third zombie computer 118. The second master computer 112 communicates with the second zombie computer 116, the third zombie computer 118, and a fourth zombie computer 120. The controller 104 then communicates with the master computers 110, 112 (either directly or through a chain of other hosts that the spammer has compromised) and orders the daemons to send spam to particular email addresses.

Although FIG. 1 is shown with two master computers and with four zombie computers, any number of master computers and zombie computers (in various configurations) may be under the control of the controller 104.

Figure 2:
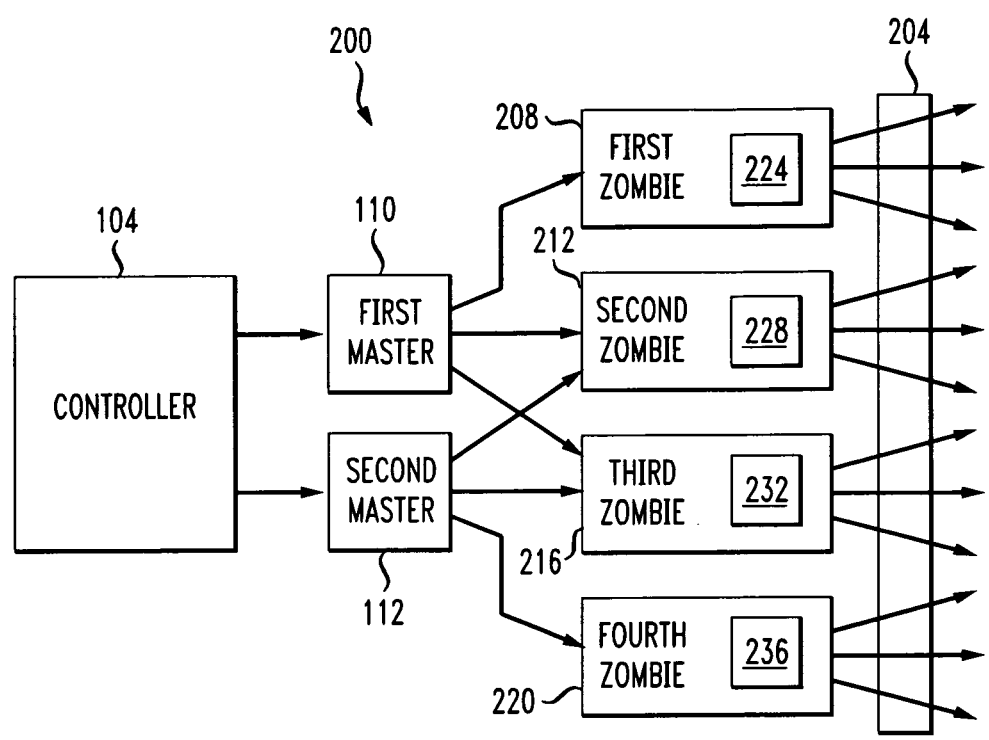
FIG. 2 is a block diagram of a network having four zombie computers and a network analysis module in accordance with an embodiment of the present invention.
Figure 3:
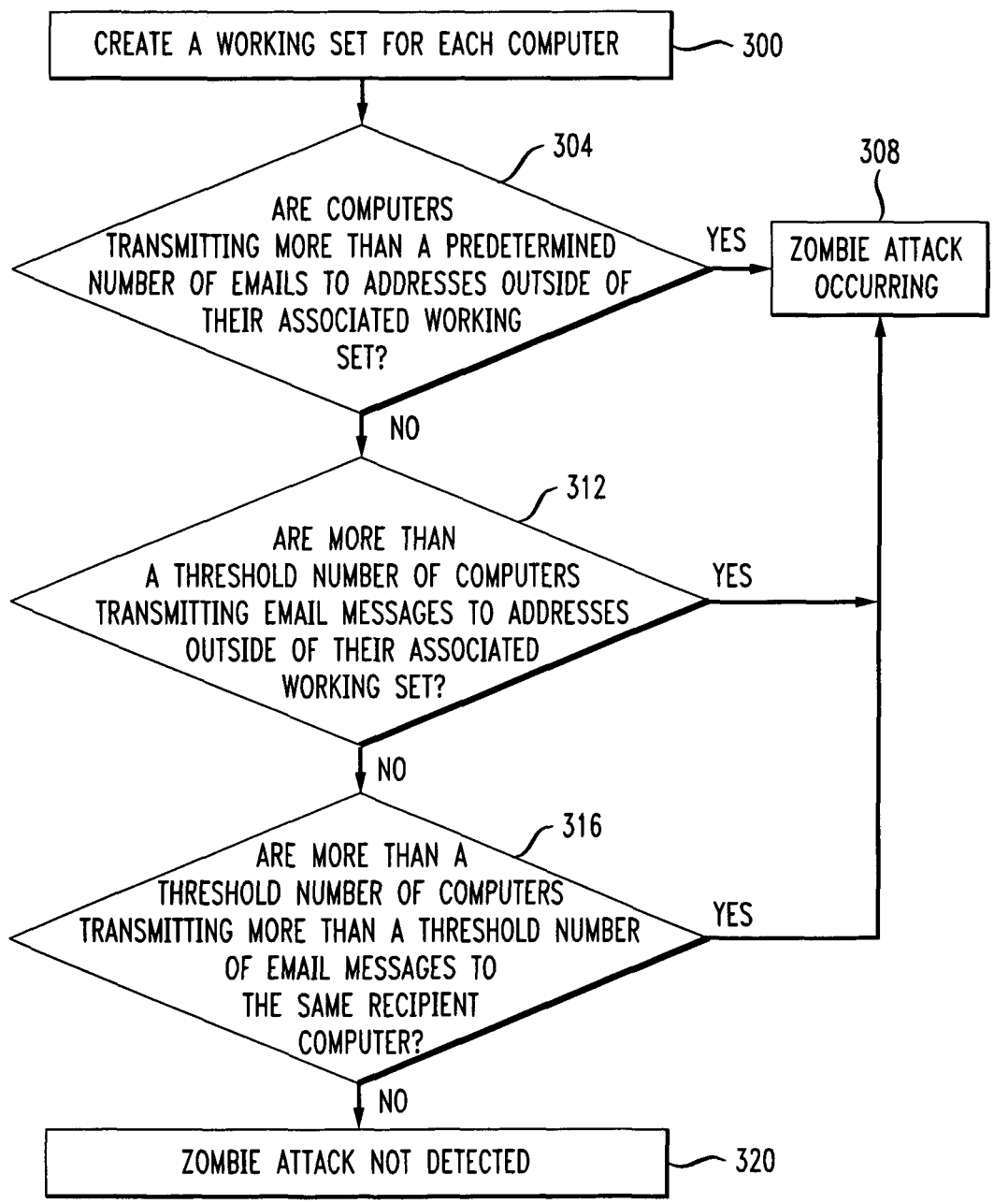
FIG. 3 is a flowchart of the steps performed by the network analysis module in accordance with an embodiment of the present invention.

FIG. 2 shows a block diagram of a network 200 having a network analysis module 204 to detect spam generated by zombie computers. FIG. 3 shows a flowchart illustrating the steps performed by the network analysis module 204 to determine when a zombie attack is occurring. The network analysis module 204 maintains a history of the email addresses to which users send email and the email addresses from which users receive email. Many users transmit email messages to a small subset of contacts or in response to email messages that they have recently received. This small subset of contacts, referred to below as a working set, is typically a subset of the total number of email addresses stored in the user's contacts. Each zombie computer 208, 212, 216, 220 has an associated working set 224, 228, 232, 236, such as a list stored in a database.

The network analysis module 204 creates a working set for each computer in a particular network hosted by an ISP in step 300. The network analysis module 204 may associate a working set with a computer by downloading the working set onto the computer. Alternatively, the network analysis module 204 relates a working set to a computer, such as by creating a record in the working set identifying the computer that the working set is associated with.

In accordance with one aspect of the present invention, the network analysis module 204 uses the working set to detect zombie computers. There are typically three checks performed by the network analysis module 204 to determine whether spam is being sent using zombie computers (i.e., a zombie attack).

The first check occurs when the network analysis module 204 determines whether one or more computers start transmitting many email messages outside of their associated working set (i.e., a zombie spew attack). In one embodiment, the network analysis module 204 determines whether more than a first threshold number of email messages are being transmitted from a zombie computer 208, 212, 216, 220 to addresses outside of the working set associated with the first zombie computer 208 in step 304. If so, then the network analysis module 204 determines that a zombie attack is occurring in step 308.

If not, the network analysis module 204 performs its second check on the zombie computers 208-220. The second check is determining whether there are more than a first threshold number of computers transmitting email messages to addresses outside of the computers' associated working set (i.e., a zombie trickle attack) in step 312. Several users emailing messages to addresses outside of their working set periodically is usually a normal occurrence. If, however, the network analysis module 204 determines that a large number of computers that do not normally send emails to addresses outside of their working set suddenly send such emails, the network analysis module 204 determines that a zombie attack (i.e., a zombie trickle attack) is occurring in step 308.

If the network analysis module 204 determines that the second check is not occurring, the network analysis module 204 then continues with a third check. The third check is determining whether more than a second threshold number of computers are transmitting more than a second threshold number of email messages to the same recipient computer (i.e., a Distributed Denial of Service (DDoS) attack) in step 316. Specifically, the daemons of the zombie computers work together and launch a distributed denial of service (DDoS) attack, flooding a targeted computer with packets in an attempt to cripple the computer's operation. If the network analysis module 204 detects that more than a second threshold number of computers are transmitting more than a second threshold number of email messages to the same recipient computer, the network analysis module 204 determines that a zombie attack is occurring in step 308. If not, then the network analysis module 204 has not detected a zombie attack in step 320.

The first threshold number of computers may or may not be related to the second threshold number of computers. In one embodiment, the first threshold is the same as the second threshold. Alternatively, they are different and/or unrelated. Similarly, the first threshold number of email messages may be related to (e.g., the same as) or unrelated to (e.g., different than) the second threshold number of email addresses.

The network analysis module 204 can be located in any position in the network so long as the network analysis module 204 can analyze the communications being transmitted from and being sent to one or more computers in the network 200. Different levels of support are possible, depending on whether the network analysis module 204 is examining the messages sent or the messages sent and received. In one embodiment, there are the following levels of support possible by the network analysis module 204: 1) examining the rates of messages sent, 2) examining the messages sent outside of the users' working sets, and 3) using the messages sent to the users to further define those working sets. Further, any number of network analysis modules can be used in the network 200 to detect a zombie attack.

Figure 4:
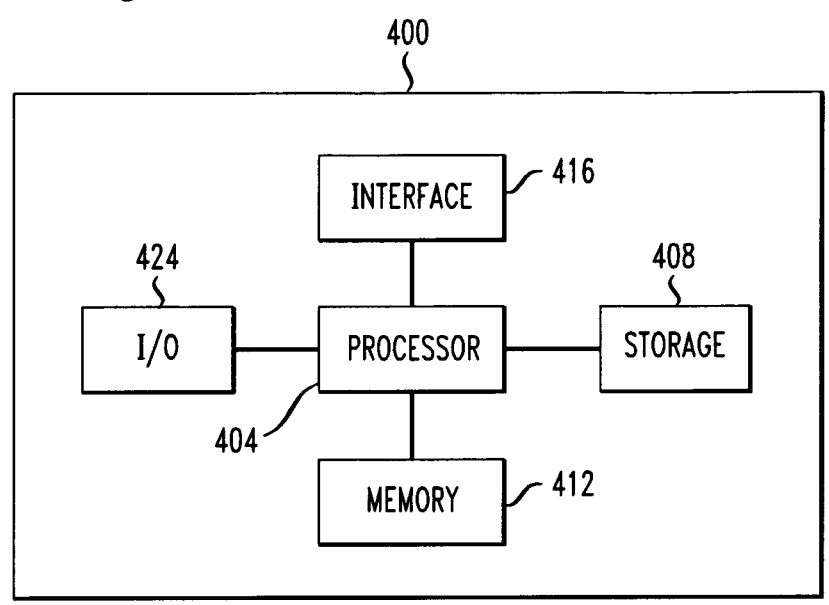
FIG. 4 shows a high level block diagram of a computer system which may be used in an embodiment of the invention.

The previous description describes the present invention in terms of the processing steps required to implement an embodiment of the invention. These steps may be performed by an appropriately programmed computer, the configuration of which is well known in the art. An appropriate computer may be implemented, for example, using well known computer processors, memory units, storage devices, computer software, and other nodes. A high level block diagram of such a computer is shown in FIG. 4. Computer 400 contains a processor 404 which controls the overall operation of computer 400 by executing computer program instructions which define such operation. The computer program instructions may be stored in a storage device 408 (e.g., magnetic disk) and loaded into memory 412 when execution of the computer program instructions is desired. Computer 400 also includes one or more interfaces 416 for communicating with other devices (e.g., locally or via a network). Computer 400 also includes input/output 424 which represents devices which allow for user interaction with the computer 400 (e.g., display, keyboard, mouse, speakers, buttons, etc.). In one embodiment, computer 400 represents the network analysis module 204.

One skilled in the art will recognize that an implementation of an actual computer will contain other nodes as well, and that FIG. 4 is a high level representation of some of the nodes of such a computer for illustrative purposes. In addition, one skilled in the art will recognize that the processing steps described herein may also be implemented using dedicated hardware, the circuitry of which is configured specifically for implementing such processing steps. Alternatively, the processing steps may be implemented using various combinations of hardware and software. Also, the processing steps may take place in a computer or may be part of a larger machine.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for detecting a zombie attack in a network comprising a plurality of computers, the method comprising:
   determining, for each particular computer in the plurality of computers, a working set associated with the particular computer, the working set comprising: a first list of email addresses including email addresses associated with emails sent by the particular computer and including email addresses associated with emails received by the particular computer;
   determining whether at least a first threshold number of computers in the plurality of computers are transmitting email messages to email addresses not included in their working set;
   determining whether at least a second threshold number of computers in the plurality of computers are transmitting at least a first threshold number of emails to a recipient computer;
   determining, for each computer in the plurality of computers, whether at least a second threshold number of emails are being transmitted to email addresses not included in its working set;
   storing, for each particular computer in the plurality of computers, data comprising:
      a second list comprising: an email address and a time associated with each sent email associated with the particular computer;
      a third list comprising an email address and a time associated with each received email associated with the particular computer; and
      a rate of emails sent by each particular computer in the plurality of computers;
   determining a change in the rate of emails sent based on the rate and the data;
   and
   detecting a zombie attack based on:
      whether at least the first threshold number of computers in the plurality of computers are transmitting email messages to email addresses not included in their working set, and
      whether at least the second threshold number of computers in the plurality of computers are transmitting at least the first threshold number of emails to a recipient computer; and
      whether the change in the rate of emails sent, associated with a particular computer is greater than a first threshold rate; and
      whether, for each computer in the plurality of computers, at least the second threshold number of emails are being transmitted to email addresses not included in its working set.

2. The method of claim 1 wherein the first threshold number of computers is equal to the second threshold number of computers.

3. The method of claim 1 wherein determining, for each particular computer in the plurality of computers, a working set of email addresses comprises:
performing network analysis on the particular computer to determine a list of email addresses associated with the particular computer.

4. The method of claim 3 wherein determining, for each particular computer in the plurality of computers, a working set of email addresses comprises:
determining a working set for the particular computer by determining to which email addresses in the list of email addresses the particular computer sends email messages.

5. The method of claim 4 wherein determining, for each particular computer in the plurality of computers, a working set of email addresses comprises:
updating the working set of email addresses.

6. A computer system for detecting a zombie attack in a network comprising a plurality of computers, the computer system comprising:
a network analysis module configured to:
determine, for each particular computer in the plurality of computers, a working set associated with the particular computer, the working set comprising: a first list of email addresses including email addresses associated with emails sent by the particular computer and including email addresses associated with emails received by the particular computer;
determine whether at least a first threshold number of computers in the plurality of computers are transmitting email messages to email addresses not included in their working set;
determine whether at least a second threshold number of computers in the plurality of computers are transmitting at least a first threshold number of email messages to a recipient computer;
determine, for each computer in the plurality of computers, whether at least a second threshold number of emails are being transmitted to email addresses not included in its working set;
store, for each particular computer in the plurality of computers, data comprising:
a second list comprising: an email address and a time associated with each sent email associated with the particular computer;
a third list comprising an email address and a time associated with each received email associated with the particular computer; and
a rate of emails sent by each particular computer in the plurality of computers;
determine a change in the rate of emails sent based on the rate and the data; and
detect a zombie attack based on:
whether at least the first threshold number of computers in the plurality or computers are transmitting email messages to email addresses not included in their working set, and
whether at least the second threshold number of computers in the plurality of computers are transmitting at least the third threshold number of emails to a recipient computer; and
whether the rate associated with a particular computer in a second predetermined time period is greater than a predetermined threshold; and
whether, for each computer in the plurality of computers, at least the second threshold number of emails are being transmitted to email addresses not included in its working set.

7. The system of claim 6 wherein the first threshold number of computers is equal to the second threshold number of computers.

8. The system of claim 6 wherein the network analysis module is further configured to perform network analysis on each particular computer in the plurality of computers to determine a list of email addresses associated with each particular computer.

9. The system of claim 8 wherein the network analysis module is further configured to determine the working set associated with each particular computer by determining to which email addresses in the list of email addresses each particular computer sends email messages.

* * * * *